US008214709B2

(12) United States Patent
Umesh et al.

(10) Patent No.: US 8,214,709 B2
(45) Date of Patent: Jul. 3, 2012

(54) COMMUNICATION APPARATUS, COMMUNICATION METHOD AND PROGRAM

(75) Inventors: Anil Umesh, Yokohama (JP); Atsushi Harada, Kawasaki (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 938 days.

(21) Appl. No.: 12/159,072

(22) PCT Filed: Dec. 26, 2006

(86) PCT No.: PCT/JP2006/325977
§ 371 (c)(1),
(2), (4) Date: Sep. 22, 2008

(87) PCT Pub. No.: WO2007/074845
PCT Pub. Date: Jul. 5, 2007

(65) Prior Publication Data
US 2009/0235137 A1    Sep. 17, 2009

(30) Foreign Application Priority Data
Dec. 28, 2005  (JP) .................................. 2005-379990

(51) Int. Cl.
*G06F 11/00* (2006.01)
(52) U.S. Cl. ......... 714/748; 714/749; 714/750; 714/751
(58) Field of Classification Search ........... 714/748–751
See application file for complete search history.

(56) References Cited

U.S. PATENT DOCUMENTS

| 6,931,569 | B2 * | 8/2005 | Fong et al. ..................... 714/18 |
| 7,047,473 | B2 * | 5/2006 | Hwang et al. ................. 714/751 |
| 7,310,336 | B2 * | 12/2007 | Malkamaki ................... 370/392 |
| 7,350,125 | B2 * | 3/2008 | Jang et al. ..................... 714/748 |
| 7,940,771 | B2 * | 5/2011 | Lee et al. ...................... 370/394 |
| 7,958,423 | B2 * | 6/2011 | Kim et al. ..................... 714/748 |
| 2001/0032325 | A1 * | 10/2001 | Fong et al. ...................... 714/18 |
| 2002/0172208 | A1 * | 11/2002 | Malkamaki ................... 370/400 |
| 2004/0052229 | A1 |  | 3/2004 | Terry et al. |
| 2005/0243831 | A1 |  | 11/2005 | Zhang et al. |

FOREIGN PATENT DOCUMENTS

| CN | 1437807 A | 8/2003 |
| JP | 2004-530364 A | 9/2004 |
| JP | 2006-033156 A | 2/2006 |
| WO | 0180476 A1 | 10/2001 |

(Continued)

OTHER PUBLICATIONS

Japanese Office Action for Application No. 2005-379990, mailed on Mar. 2, 2010 (5 pages).

(Continued)

*Primary Examiner* — Marc Duncan
(74) *Attorney, Agent, or Firm* — Osha • Liang LLP (57) ABSTRACT

A communication apparatus includes an error detection unit conducting error detection on N packet data units received in N transmission processes; a first transmission unit transmitting an affirmative response signal or a first retransmission request signal depending on a result of the error detection; a storage unit storing an affirmatively responding packet for forwarding to an upper layer; a second transmission unit, if affirmatively responding packets are not consecutive, determining whether a missing packet must be retransmitted and transmitting a second retransmission request signal; and a forwarding unit reordering the packet data units and forwarding the packets in the storage unit to the upper layer.

5 Claims, 8 Drawing Sheets

FOREIGN PATENT DOCUMENTS

| | | |
|---|---|---|
| WO | 02091659 A2 | 11/2002 |
| WO | 2004/091129 A1 | 10/2004 |
| WO | 2005/004374 A2 | 1/2005 |

OTHER PUBLICATIONS

Samsung Electronics, "Reordering for in sequence delivery" 3GPP TSG-RAN WG2#22 R2-011601, Jul. 2001, URL http://www.3gpp.org/ftp/tsg_ran/WG2_RL2/TSGR2_22/Docs/Zips/R2-011601.zip.

Chinese Office Action issued in Chinese Application No. 200680049903.2 dated Mar. 23, 2011 and English Translation thereof 13 pages.

Nokia, Some HARQ issues, 3gpp TSG-RAN WG2 #21 R2 011179, May 2001, URL, http://www.3gpp.org/ftp/tsg_ran/WG2_RL2/TSGR2_21/Docs/Zips/R2-01 1179.zip.

Japanese Office Action for Application No. 2005-379990, mailed on Jun. 29, 2010 (5 pages).

"3rd Generation Partnership Project", Technical Specification Group Radio Access Network, Radio Interface Protocol Architecture (Release 6), 3GPP TS 25.301 V6.4.0 (Sep. 2005), retrieved from the Internet: <URL: http://www.3gpp.org>, 48 pages.

Mitsubishi Electric; "Multiple number of SAW ARQ processes," 3GPP TSG RAN WG1#38, R1-040876, Aug. 16-20, 2004, retrieved from the Internet:<URL:http://www.3gpp.org./ftp/tsg_ranWG1_RL1/TSGR1_38/Docs/Zips/R1-040876.zip, 3 pages.

International Search Report issued in PCT/JP2006/325977, mailed on Mar. 20, 2007, w/translation, 4 pages.

Written Opinion issued in PCT/JP2006/325977, mailed on Mar. 13, 2007, 4 pages.

Extended European Search Report for Application No. 06843361.4, mailed on Mar. 5, 2012 (7 pages).

\* cited by examiner

COMMUNICATION APPARATUS, COMMUNICATION METHOD AND PROGRAM

TECHNICAL FIELD

The present invention relates to the technical field of mobile communications, and more particularly relates to a communication apparatus, method and program for communicating packets by issuing Hybrid Automatic Repeat reQuests (HARQ).

BACKGROUND ART

In this technical field, Automatic Repeat reQuest (ARQ) method is utilized for improved communication reliability. In the ARQ method, received packets are subjected to error detection, and the transmitter side is requested to retransmit packets including unacceptably significant errors. The error detection may be conducted in accordance with any existing technique such as CRC (Cyclic Redundancy Check) scheme. In response to receipt of the request, the transmitter side retransmits the requested packets. As a result, it is possible to partially prevent an application in the receiver side from running without any packet.

Figure 1:
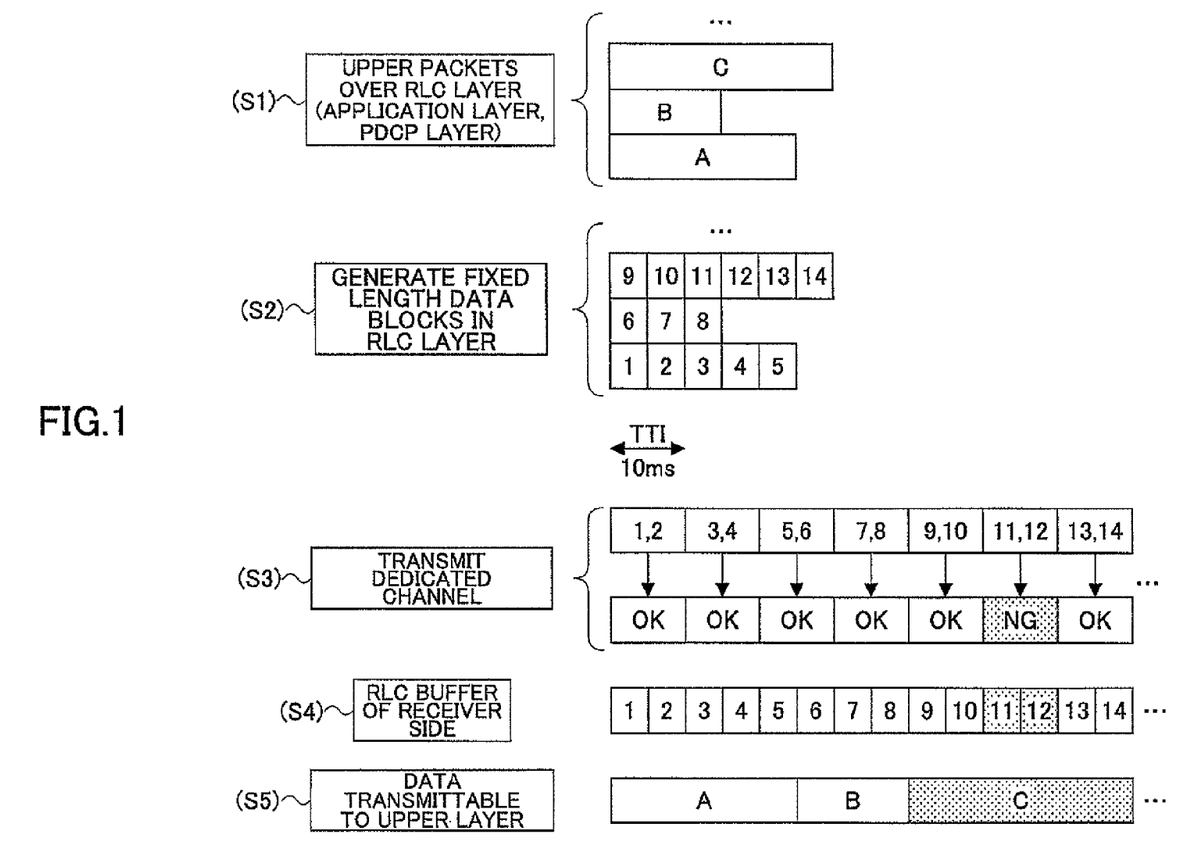
FIG. 1 shows a conventional retransmission operation.

FIG. 1 shows an exemplary operation of the ARQ method. For example, Internet Protocol (IP) based packets A, B, C, . . . are received from an upper apparatus and stored in a reception buffer in a base station in the order (S1). The received IP packet is divided into fixed length blocks for transmission in a lower layer (S2). Then, radio transmission of a predefined number of blocks is sequentially carried out via physical channels, and the blocks are received at a mobile station (S3). In the illustrated example, two blocks are transmitted in each transmission time interval (TTI). The mobile station conducts error detection on the received packets. The received packets are stored in a RLC (reception) buffer in the mobile station (S4). In this case, retransmission requests for error detected packets are transmitted to the base station. In the illustrated example, errors are detected for the 11th and 12th blocks as illustrated in "NG", and the mobile station requests the base station to retransmit the blocks. The mobile station forwards error free packets to layers above the RLC such as an application layer (S5). A packet including the detected error, which corresponds to packet C in the illustration, is discarded, and then the mobile station waits for an appropriate packet and after completion of the retransmission procedure, forwards the retransmitted packet to an upper layer.

For further improvement in the communications reliability, a Hybrid ARQ (HARQ) scheme resulting from the error correction scheme being combined with the ARQ scheme is proposed. This may be also employed in the HSDPA (High Speed Downlink Packet Access) scheme.

Figure 2:
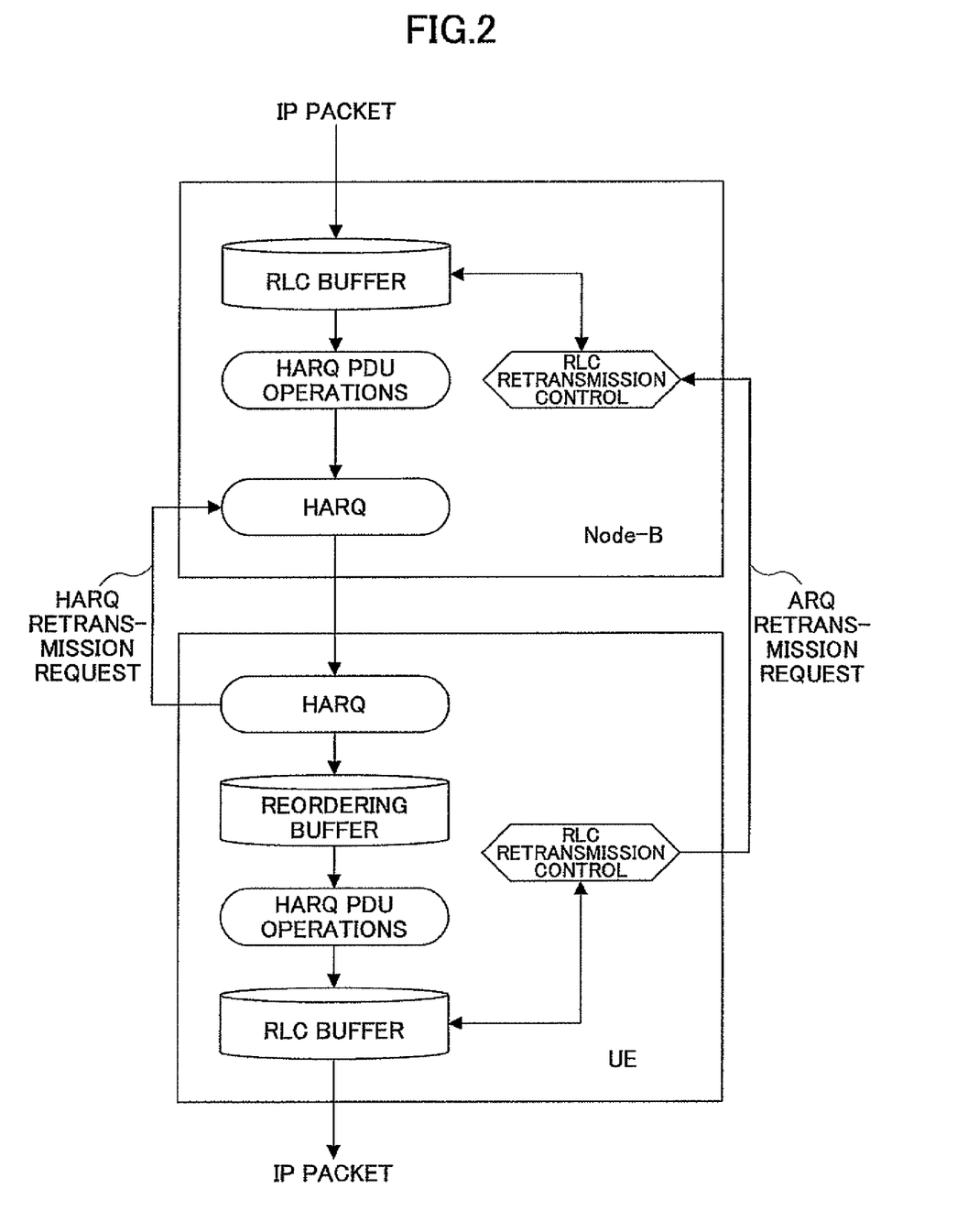
FIG. 2 shows a schematic functional block diagram of a conventional base station and a conventional mobile station.
Figure 3:
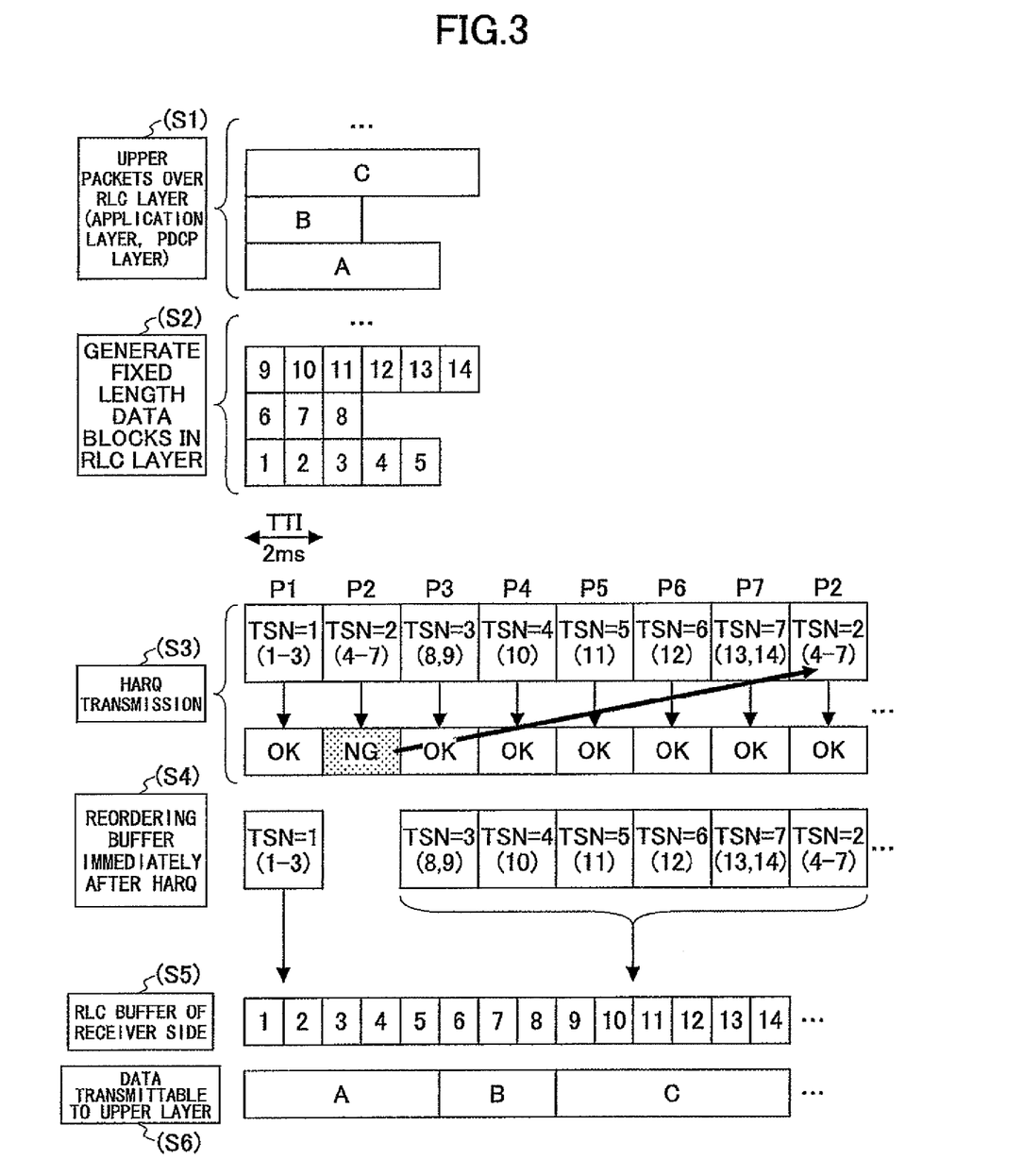
FIG. 3 shows a conventional retransmission operation.

FIG. 2 is a schematic block diagram illustrating a base station and a mobile station in accordance with the HARQ scheme, and FIG. 3 shows an exemplary operation of the HARQ scheme. IP packets A, B, C, . . . are received from an upper apparatus and stored in an RLC/ARQ or reception buffer (FIG. 2) in a base station in order (S1 in FIG. 3). The received IP packets are divided into fixed length blocks in the RLC buffer in FIG. 2 (S2). Then, one or more fixed length blocks are bundled and transmitted in an HARQ-PDU processing unit depending on the radio environment. The individual blocks are identified with the sequence number (SN=1, 2, . . . ). The IP packets are radio transmitted via physical channels in unit of a predefined number of blocks and are received in a mobile station (S3). Packet data units including one or more blocks are assigned the respective numbers (TSN=1, 2, . . . ), and processes for transmitting information items specified by the numbers are assigned process numbers (P1, P2, . . . ). The mobile station performs error detection on the received packets, and if an error is detected as illustrated in "NG", the mobile station requests the base station to retransmit the associated packet. The received packets are stored in a reordering buffer illustrated in FIG. 2 (S4). The reordering buffer holds packets not being in need of retransmission until missing packets are received. In the illustrated example, an error is detected for a packet data unit corresponding to TSN=2 (whose process number is P2), and the mobile station requests the base station to retransmit it. In response, the base station conducts retransmission. In the illustrated example, the retransmitted packets are received without any error and stored in the reordering buffer. At this stage, the retransmission requests are carried out in a MAC sublayer. The stored packets are reordered in the reordering buffer in order of the TSN number. The properly reordered packets are decomposed into packet data units (RLC-PDUs) in the RLC layer and then stored in the RLC buffer (S5). It is determined whether the packets stored in the RLC buffer are also continuous in terms of the sequence number SN. The determination is made because in an exemplary case of an error still being detected even after the maximum retransmission times are reached in the HARQ, a missing packet may still be detected in a packet in the RLC buffer. In such a case, retransmission in the RLC layer is requested by the mobile station to the base station. At this stage, the retransmission request operations are carried out in the RLC layer (also referred to as an ARQ layer). The mobile station forwards error free packets to an upper layer such as an application layer from the RLC. For packets including error detected blocks, the mobile station waits for an appropriate packet and after completion of the retransmission procedure, forwards the retransmitted packets to the upper layer (S6). The above-mentioned conventional ARQ and HARQ methods are described in non-patent document 1 publicly disclosed at the filing date of the base priority application of the present application.

Non-patent document 1: 3GPP TS 25.301 6.4.0, Internet <URL: http://www.3gpp.org>

DISCLOSURE OF INVENTION

Problem to be Solved by the Invention

Since the sequence number SN for specifying packet data units in the RLC layer and the number TSN for specifying packet data units in the MAC layer are represented with fixed numbers of bits, these numbers are cyclically assigned to the packets. For example, if the sequence number SN is represented with 12 bits, $2^{12}=4,096$ numbers are cyclically used. For this reason, in the case of a single number being assigned to each transmitted packet, the receiver side cannot determine without difficulty whether the received packet belongs to the current cycle or the previous cycle.

In order to eliminate such inconvenience, some technique referred to as transmission stalling is conventionally used. In this technique, without confirmation response from the receiver side, the number of continuously transmittable packet data units is limited in the transmitter side. Specifically, 2,048 packets following the packet of SN=i, that is, the packets of SN (i+1) through (i+2049), maybe continuously transmitted after transmission of the packet of SN=i while the SN (i+2050) and subsequent packets are prevented from being transmitted until ACK (confirmation response or affirmative response) is obtained. Once the transmitter obtains the confirmation response for the packet of SN=i, 2,048 packets of SN=(i+2) through (i+2051) may be transmitted after transmission of the packet of SN=(i+1) without confirmation response of the packet of SN=i+1. The number or size of packets transmittable without confirmation response is referred to as a transmission window. Each time a confirmation response is consecutively obtained, the range of the transmission window is incrementally shifted in the increasing direction of the SN. On the other hand, if a confirmation response is not consecutively obtained, the range of the transmission window is not shifted. By limiting the number of packets transmittable without confirmation response to half of the maximum of numbers that can be represented, the receiver can determine whether received packets are retransmitted ones. Such a scheme is also referred to as Stop And Wait (SAW) scheme.

As stated above, the retransmission operations are carried out in both the MAC layer and the RLC layer. In any of the layers, the packet data units are specified with a fixed number of bits, and thus the transmission stalling may be carried out in the retransmission operations in both layers. However, the packet data units have different sizes in the MAC layer and the RLC layer, and the reception timings of confirmation responses (ACKs) after data transmission may differ from each other in the MAC layer and the RLC layer. As a result, the transmission window has different sizes in the layers. In general, confirmation responses may be more quickly obtained in the MAC layer than the RLC layer. For example, the size of the transmission window for retransmission request operations in the RLC layer can be set to be 2,048, and the size of the transmission window in the MAC layer can be set to be 16. It is assumed that the maximum number of the TSN is equal to 32.

Figure 4:
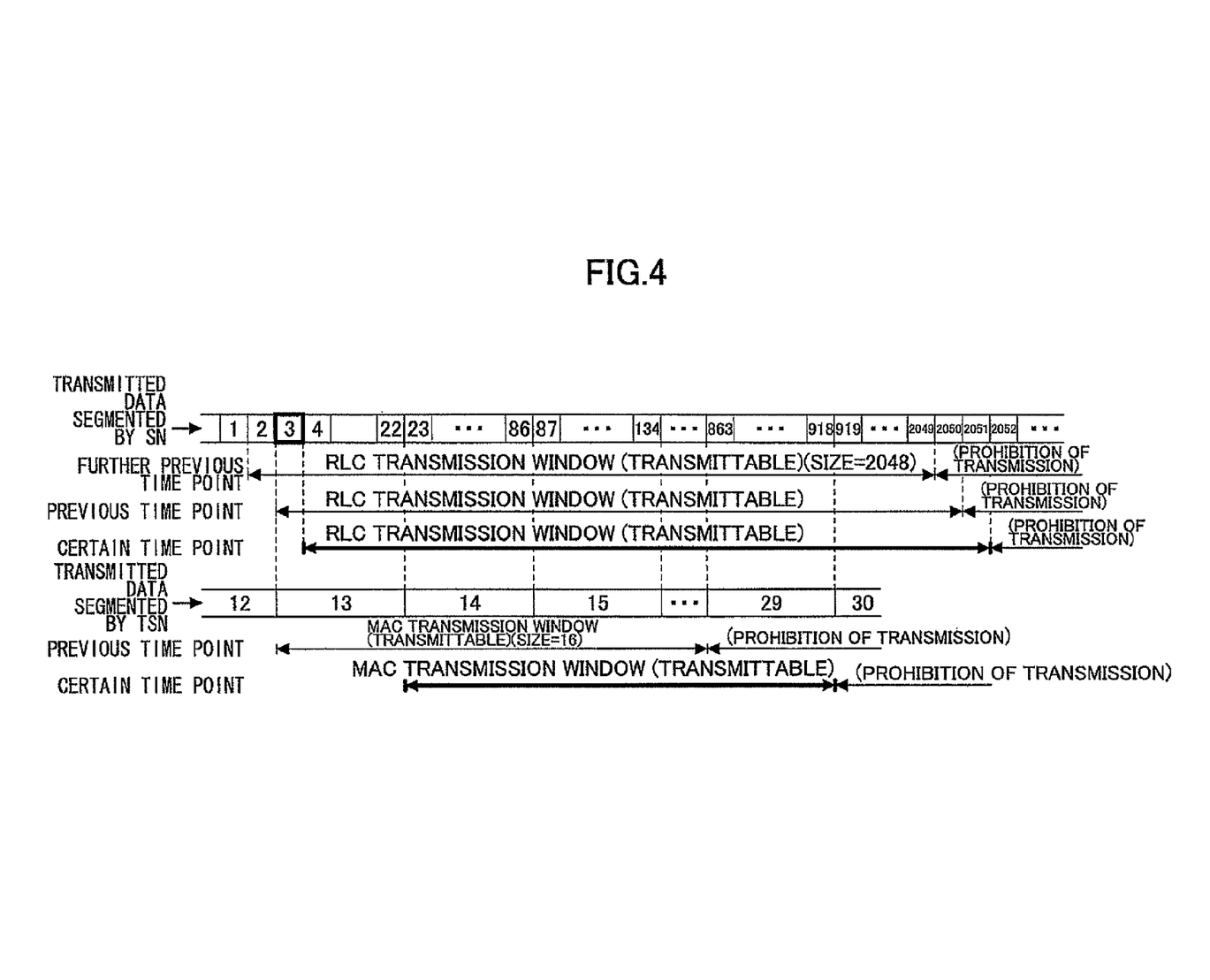
FIG. 4 is a diagram for explaining a problem of a conventional retransmission operation.

However, if the transmission stalling is carried out separately in the MAC layer and the RLC layer, the transmitter can transmit only packets belonging to both transmission windows. In other words, even if data belongs to one of the transmission windows, if it is not within the range of the other transmission window, transmission of the data is prevented. FIG. 4 shows separate operations of the transmission stalling. In the illustrated example, it is assumed that confirmation responses have been already obtained for the packets of SN=1, 2, while no confirmation response has been obtained for the packet of SN=3. At this time point, the packets of SN=4 through 2051 following the packet of SN=3 may be continuously transmitted, while the packet of SN=2052 and the subsequent packets are prevented from being transmitted. On the other hand, in the illustrated example, the packet of SN=3 is included in the packet data unit of TSN=13. Thus, according to the transmission stalling in the MAC layer, the packets of TSN=14 through 29 following the packet of TSN=13 may be continuously transmitted, while the packet of TSN=30 and the subsequent packets are prevented from being transmitted. As a result, the packets of SN=3 through 918 may be continuously transmitted, while the packet of SN=919 and the subsequent packets are prevented from being transmitted. In this manner, according to the conventional scheme, the transmitter side can transmit only packets belonging to both transmission windows, which may be disadvantageous from the viewpoint of improved throughput.

One object of the present invention is to provide a communication apparatus, a retransmission control method and a program for forwarding packets appropriately and quickly in a communication system in accordance with N process SAW based retransmission control.

Means for Solving the Problem

In the present invention, a communication apparatus for receiving data in accordance with N process SAW (Stop And Wait) based hybrid ARQ method is used. The communication apparatus includes an error detection unit conducting error detection on N packet data units received in N transmission processes; a first transmission unit transmitting an affirmative response signal or a first retransmission request signal depending on a result of the error detection; a storage unit storing an affirmatively responding packet for forwarding to an upper layer; a second transmission unit, if affirmatively responding packets are not consecutive, determining whether a missing packet must be retransmitted and transmitting a second retransmission request signal; and a forwarding unit reordering the packet data units and forwarding the packets in the storage unit to the upper layer.

Advantage of the Invention

According to the embodiments of the present invention, packets can be appropriately and quickly transmitted in a communication system in accordance with N process SAW based retransmission control.

LIST OF REFERENCE SYMBOLS

UE: user equipment
ARQ: automatic retransmission request
HARQ: hybrid automatic retransmission request
PDU: packet data unit
RLC: radio link control
MAC: media access control

BEST MODE FOR CARRYING OUT THE INVENTION

Hereinafter, the present invention will be described from the viewpoint of protocol hierarchy. Conventional protocol hierarchy will be also described for comparison.

Figure 5A:
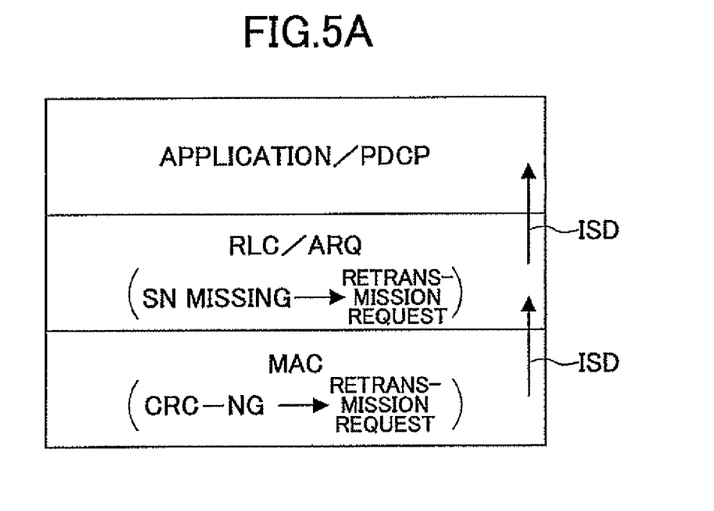
FIG. 5A shows a conventional protocol hierarchy.

FIG. 5A shows an exemplary layer model for conventional techniques as illustrated in FIGS. 2 and 3. As stated above, received packets are subjected to error detection in the layer 1/MAC layer, and in response to error detection (or detection of significant errors exceeding acceptable level) as indicated in CRC-NG in the illustration, retransmission of the error packet is requested. In the RLC/ARQ layer, it is determined whether the sequence numbers SNs are consecutive, and if it is detected that a certain sequence number is missing, retransmission of the packet is requested. Data transmission from the MAC layer to the RLC/ARQ layer is carried out under conditions where the packet order is conserved. Operations for arranging the order are carried out in a reordering buffer. Transmission of packets to an upper layer under conditions of the order being arranged is referred to as In Sequence Delivery (ISD). Also, data transmission of packets from the RLC/ARQ layer to an upper layer (an application layer or a PDCP layer in the illustration) is carried out in accordance with ISD. In the RLC layer, the sequence number SN is monitored, and if it is detected that a certain sequence number is missing, the retransmission is carried out to maintain the packet order in the RLC reception buffer.

This scheme may be preferable from the viewpoint of reliable arrangement of the data order. However, since two transmission stalling operations are separately carried out by using different transmission windows, the throughput may be degraded as stated above. On the other hand, the essential purpose of the retransmission is to supply a series of consecutive packets without any missing packet to an application layer and/or others. Thus, it may not be a requirement to fulfill respective ISDs in the two separate transmission stalling operations. The present invention can conserve the order of packets forwarded to an upper layer without the duplicated transmission stalling operations through improved triggering of retransmission requests.

Figure 5B:
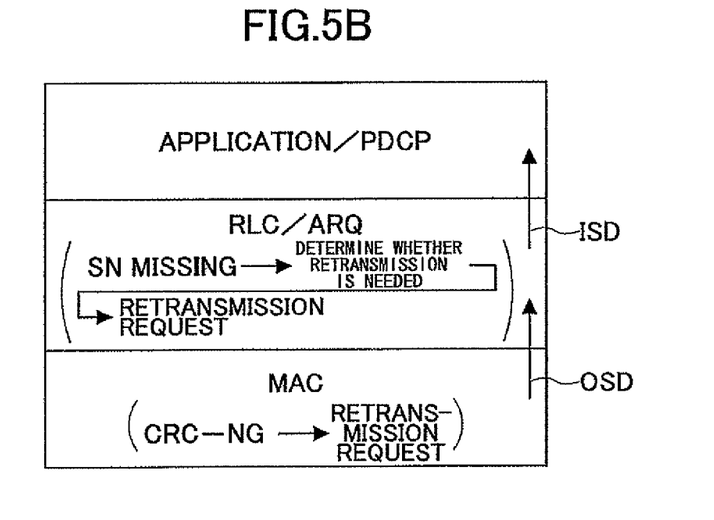
FIG. 5B shows a protocol hierarchy according to the present invention.

FIG. 5B shows an exemplary layer model for the present invention. The type and name of layers where operations are carried out are only by way of example, and the present invention may be applied to various systems where the N process SAW scheme based HARQ method is used. In the layer 1/MAC layer, received packets with CRC are subjected to error detection, and in response to error detection (or detection of significant errors exceeding acceptable level) as indicated in CRC-NG in the illustration, retransmission of the error packet is requested. In the RLC/ARQ layer, it is determined whether the sequence numbers SNs are consecutive, and if it is detected that a certain sequence number is missing, it is determined whether retransmission of the relevant packet must be truly requested. Then, if so, the retransmission is requested. While data transmission from the RLC/ARQ layer to an upper layer is carried out in ISD, the order may not be conserved in data transmission from the MAC layer to the RLC/ARQ layer. In other words, the transmission is carried out in Out of Sequence Delivery (OSD). Unlike conventional schemes, the order conservation is conducted based on not the sequence number (TSN number) in the HARQ layer but the sequence number (SN number) in the ARQ layer. For this reason, there is a single transmission window in the transmission stalling. Note that the sequence numbers in the HARQ layer and the ARQ layer may be integrated and managed. In application to the above-mentioned example, the packet order is conserved by using the transmission window having the size of 2,048 sequence numbers, and the other transmission window having the size of 16 TSN numbers is not used. As a result, it is possible to substantially avoid degraded throughput as conventionally experienced. However, the present invention differs from conventional techniques in triggering of retransmission requests in the RLC/ARQ layer. Even if it is detected that a certain sequence number is missing, retransmission is not requested before it is determined that retransmission of the relevant packet must be truly requested. In this manner, triggering of the retransmission requests is improved, resulting in omission of one of the two transmission stalling operations, and thus well-ordered packets can be promptly forwarded to an application layer and other layers.

First Embodiment

Hereinafter, one embodiment of the present invention will be described in the context of downlink transmission from a base station to a mobile station. However, the present invention can be also applied to the inverse data transmission direction.

Figure 6:
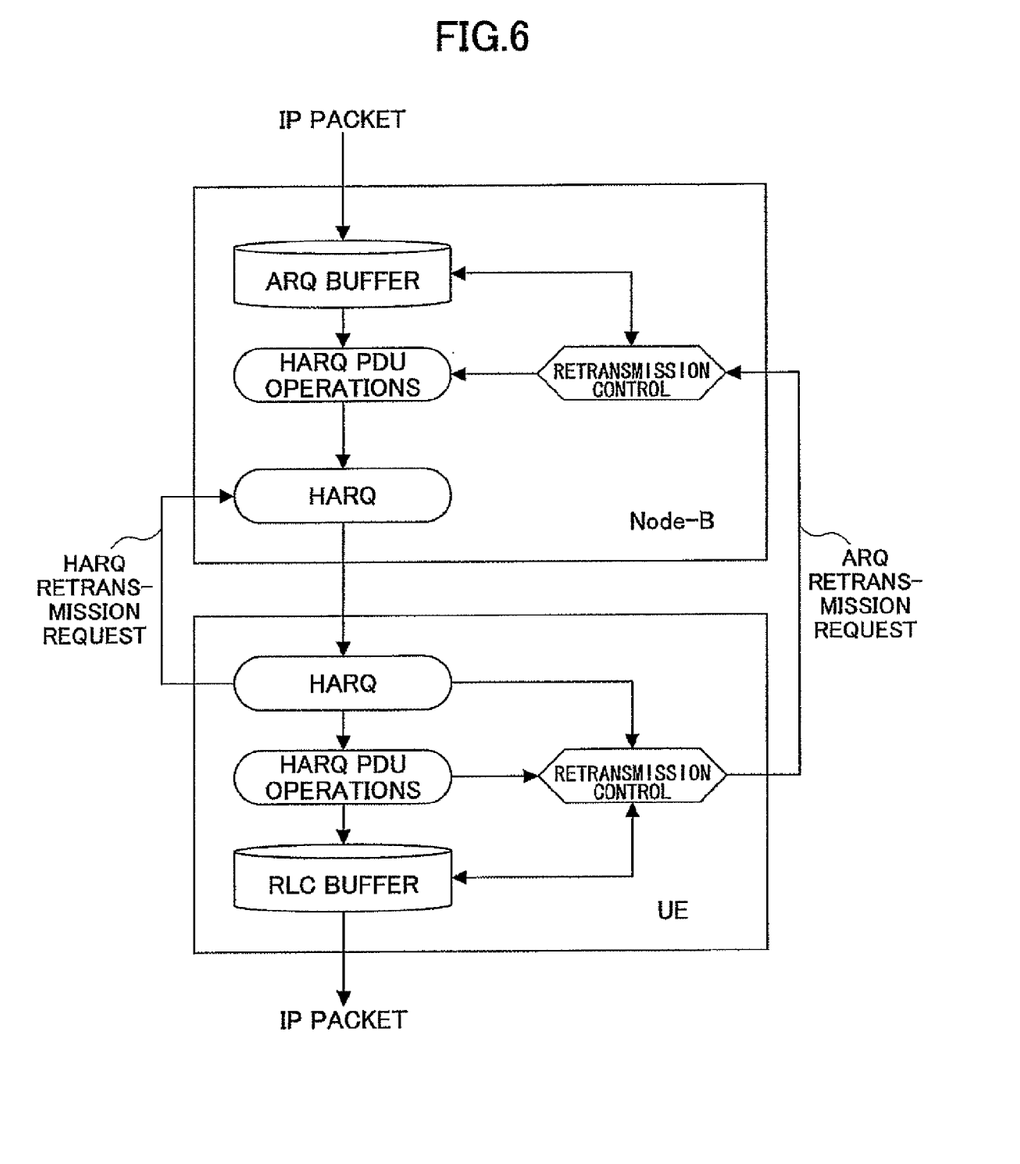
FIG. 6 shows a schematic functional block diagram illustrating a base station and a mobile station according to one embodiment of the present invention.
Figure 7:
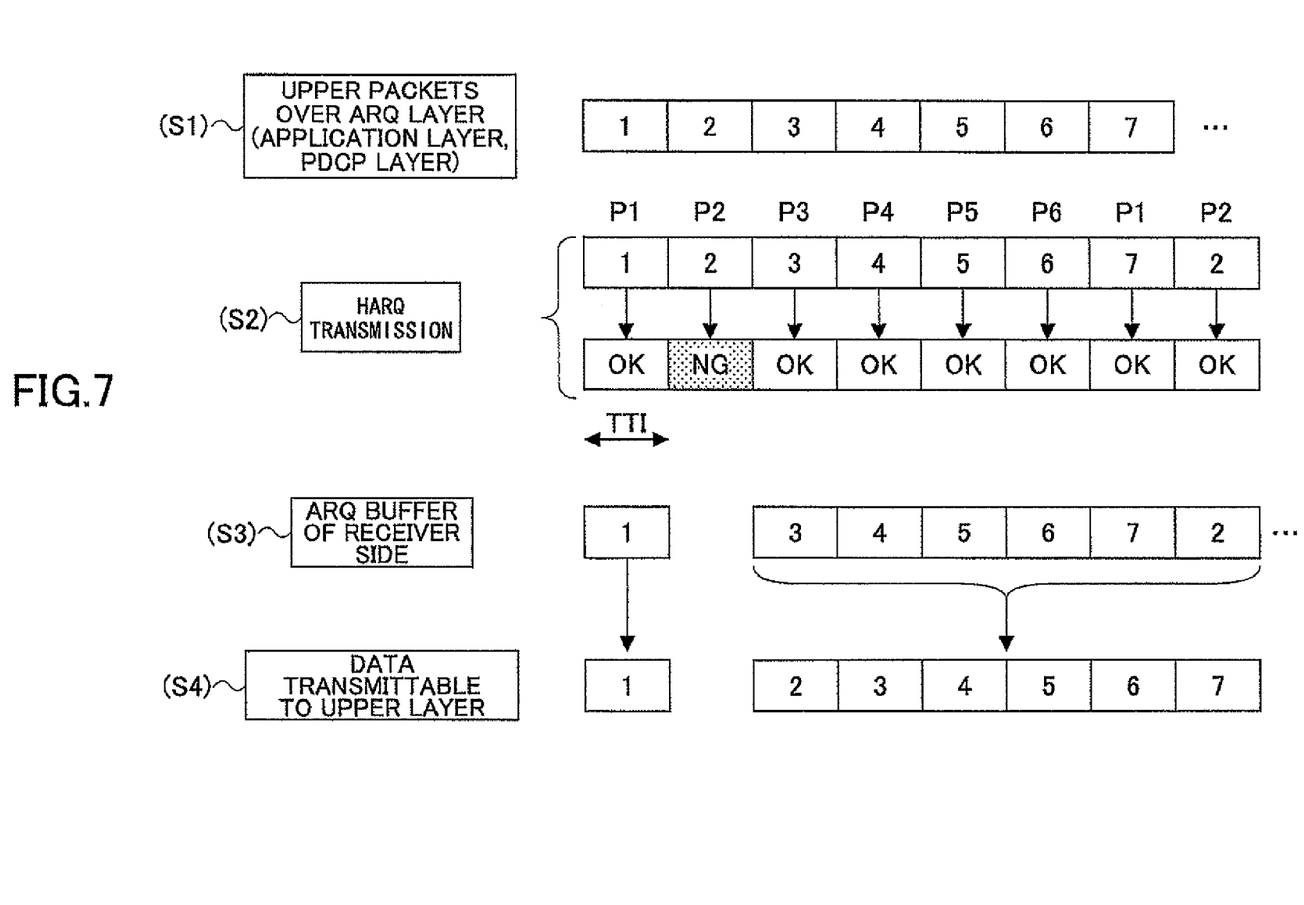
FIG. 7 shows a retransmission operation according to one embodiment of the present invention.

FIG. 6 shows a schematic block diagram illustrating a base station and a mobile station operating in the HARQ method according to one embodiment of the present invention, and FIG. 7 shows an exemplary operation thereof. A retransmission request operation is described in detail with reference to FIG. 8. IP packets A, B, C, . . . from an upper apparatus are consecutively stored in an ARQ or reception buffer (FIG. 6) in the base station (S1 in FIG. 7). The received IP packets may be divided into fixed length blocks in the ARQ buffer in FIG. 6. The present invention can be used regardless of the PDU size. Thus, the PDU size is made uniform in the illustration in FIG. 7, but various sizes of PDU may be used. For convenience, transmitted packets are identified with the sequence number (SN=1, 2, . . . ).

These packets are radio transmitted in physical channels and are received at a mobile station (S2). The process number (P1, P2, . . . ) is assigned to processes for transmitting information specified with the SN. The mobile station conducts error detection on the received packets, and if an error is detected as shown in "NG", the mobile station requests the base station to retransmit the relevant packets. For simplicity of explanation, the retransmission request at this stage is referred to as "HARQ retransmission request". Processing units as shown in "HARQ" in the base station and the mobile station in FIG. 6 are responsible for operations associated with the retransmission request in the layer 1/MAC layer.

The received packets are stored in the ARQ buffer (S3). The ARQ is used to buffer the received packets like the RLC buffer in FIG. 2, but the ARQ buffer may operate differently from the RLC buffer in coordination with the retransmission control unit, for example, in that it may refrain from the retransmission requests even in cases of the packet order being inconsecutive in the buffer. In these cases, it is determined whether the sequence numbers SN for the packets stored in the ARQ buffer are inconsecutive, and if needed, a retransmission request is issued. For simplicity of explanation, the transmission request in this stage is referred to as "ARQ retransmission request".

The mobile station forwards error free packets to an upper layer (an application layer and/or others) above the RLC. For a packet including an error detected block, the mobile station waits for an appropriate packet and forwards the retransmitted packet after completion of the retransmission operation (S4).

Figure 8:
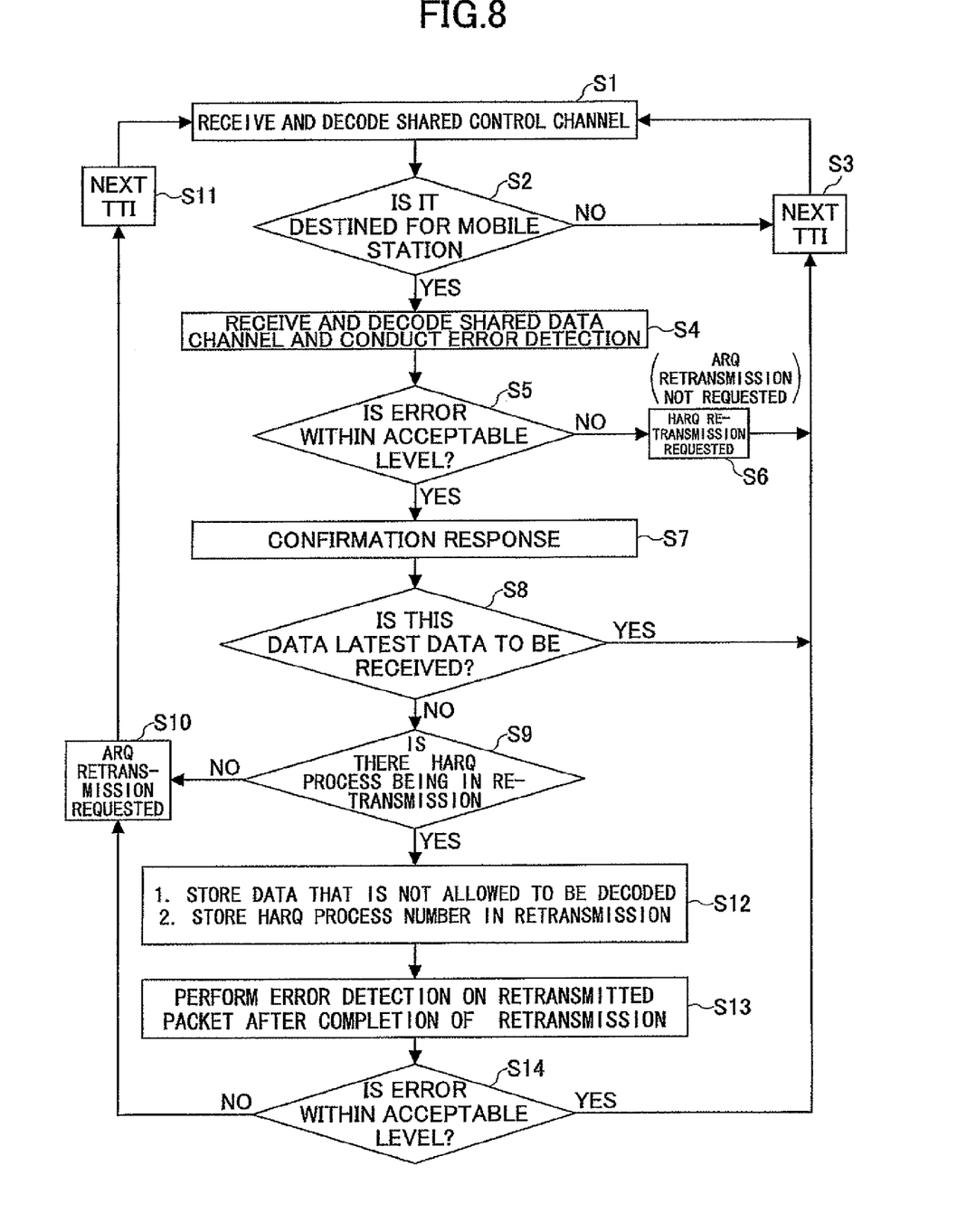
FIG. 8 is a flowchart of a retransmission request operation according to one embodiment of the present invention.

FIG. 8 is a flowchart illustrating an exemplary operation associated with a retransmission request. The operation illustrated in this flowchart is mainly carried out in the retransmission control unit in a mobile station. At step S1, the mobile station receives and decodes a downlink shared control channel.

At step S2, it is determined whether there exists data destined for the mobile station. If no data is destined for the mobile station, the control proceeds to step S3 where the mobile station waits for the next transmission time interval. Then, the control returns to step S1.

At step S4, the mobile station receives and decodes the data destined for itself in a shared data channel.

At step S5, the mobile station conducts error detection on the decoded packets. If a significant error exceeding an acceptable level is detected, the control proceeds to step S6 where the mobile station request a base station to retransmit the relevant packet. Then, the control returns to step S1.

At step S7, if no error or an error less significant than the acceptable level is detected, the mobile station transmits confirmation responses (ACK) for the packets. The confirmation response indicates that the relevant packet has been properly received in the mobile station.

At step S8, the sequence number of the properly received packet is identified, and then it is determined whether the identified sequence number is the smallest in packets to be received. In other words, it is determined whether the order of the packets to be acknowledged is consecutive. If the identified sequence number is the smallest, the control proceeds to step S3 and then returns to step S1. For example, assuming that the packet of the sequence number SN=1 has been just received, the next smallest sequence number becomes 2. On the other hand, if the identified sequence number does not correspond to the smallest sequence number, the control proceeds to step S9. This may correspond to a situation where after proper reception of the packet of SN=1, the packet of SN=2 becomes a packet to be retransmitted and the packet of SN=3 has been properly received.

At step S9, it is determined whether there is an HARQ process (retransmission process) where the retransmission operation has not been finished. This determination is made, for example, by the retransmission control unit verifying operations in the HARQ processing unit. If there is no retransmission process that has not been finished, the control proceeds to step S10. Otherwise, the control proceeds to step S12.

At step S10, the mobile station requests the base station to retransmit a missing packet identified at step S8 (ARQ retransmission request). Subsequently, the control proceeds to step S11 where the mobile station waits for the next transmission time interval. Then, the control returns to step S1. According to the embodiment of the present invention, unlike conventional schemes, even if the order of packets to be acknowledged is not consecutive, a retransmission request is not immediately issued. It is determined at step S9 whether an unfinished retransmission process exists, and if no unfinished retransmission process exists, the retransmission request is issued. As a result, it is possible to advantageously avoid unnecessary retransmission requests.

At step S12, the mobile station stores in a memory which packet is being retransmitted (specifically, the sequence number of the packet) and the process number of the process by which the packet is to be retransmitted.

At step S13, after all stored processes where the packets are under retransmission have been finished, the retransmitted packets whose sequence numbers are stored at step S12 are subjected to error detection.

At step S14, the retransmitted packets are subjected to error detection. If an error is within the acceptable range, the relevant packet is stored in the ARQ buffer. The control proceeds to step S3 where the mobile station waits for the next transmission time interval. Then, the control returns to step S1. On the other hand, if the error exceeds the acceptable level, the control proceeds to step S10 where the mobile station requests the base station to retransmit the improperly received packet (ARQ retransmission request). For example, this may correspond to situations where the maximum time of retransmission has been carried out but the packet could not be received with satisfactory quality and/or where the packet has not been received with satisfactory quality during a predefined period of delay time. The control proceeds to step S11 where the mobile station waits for the next transmission time interval. Then, the control returns to step S1.

The specific embodiments of the present invention have been described above, but the present invention is not limited to the embodiments and various modifications and variations can be made within the spirit of the present invention.

This international patent application is based on Japanese Priority Application No. 2005-379990 filed on Dec. 28, 2005, the entire contents of which are hereby incorporated by reference.

The invention claimed is:

1. A communication apparatus for receiving packet data in accordance with an N process SAW based hybrid ARQ method, comprising:
    an error detection unit conducting error detection on each of multiple packet data received in multiple transmission processes;
    a first transmission unit transmitting an affirmative response signal or a retransmission request signal in a MAC layer depending on a result of the error detection;
    a storage unit storing affirmatively responding packet data for forwarding to an upper layer of a RLC layer;
    a second transmission unit, if affirmatively responding packet data are not consecutive, determining whether missing packet data must be retransmitted and transmitting a retransmission request signal in the RLC layer; and
    a forwarding unit reordering the packet data and forwarding the packet data in the storage unit to the upper layer, wherein the packet data received at the communication apparatus have been transmitted in the MAC layer without limitation on a number of packet data consecutively transmittable without affirmative response from the communication apparatus and in the RLC layer with limitation on a predefined number of packet data consecutively transmittable without affirmative response from the communication apparatus.

2. The communication apparatus as claimed in claim 1, wherein the retransmission request signal in the RLC layer is generated if a retransmission process for the missing packet data is not being carried out or if an error is detected in the missing packet data even after completion of the retransmission process for the missing packet data.

3. The communication apparatus as claimed in claim 1, wherein the order of packet data is determined with identification numbers assigned to the respective packet data.

4. A method of receiving packet data at a communication apparatus in accordance with an N process SAW based hybrid ARQ method, comprising the steps of:
    conducting error detection on each of multiple packet data received in multiple transmission processes;
    transmitting an affirmative response signal or a retransmission request signal in a MAC layer depending on a result of the error detection;
    storing affirmatively responding packet data for forwarding to an upper layer of a RLC layer and determining order of the packet data;
    if the determined order is not consecutive, determining whether missing packet data must be retransmitted and transmitting a retransmission request signal in the RLC layer; and
    reordering the packet data and forwarding the packet data in the storage unit to the upper layer, wherein the packet data received at the communication apparatus have been transmitted in the MAC layer without limitation on a number of packet data consecutively transmittable without affirmative response from the communication apparatus and in the RLC layer with limitation on a predefined number of packet data consecutively transmittable without affirmative response from the communication apparatus.

5. The method as claimed in claim 4, wherein the retransmission request signal in the RLC layer is generated if a retransmission process for the missing packet data is not being carried out or if an error is detected in the missing packet data even after completion of the retransmission process for the missing packet data.

* * * * *